United States Patent
Aoki et al.

(10) Patent No.: US 7,589,151 B2
(45) Date of Patent: Sep. 15, 2009

(54) THERMOPLASTIC RESIN COMPOSITION AND MOLDED ARTICLE COMPRISING THE SAME

(75) Inventors: Hideo Aoki, Kawasaki (JP); Masakazu Ito, Otake (JP); Takashi Miura, Kawasaki (JP); Masahiro Osuka, Kawasaki (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 62 days.

(21) Appl. No.: 10/591,455

(22) PCT Filed: Mar. 4, 2005

(86) PCT No.: PCT/JP2005/003760

§ 371 (c)(1),
(2), (4) Date: Jan. 18, 2007

(87) PCT Pub. No.: WO2005/085352

PCT Pub. Date: Sep. 15, 2005

(65) Prior Publication Data

US 2007/0276090 A1 Nov. 29, 2007

(30) Foreign Application Priority Data

Mar. 5, 2004 (JP) .............................. 2004-062387

(51) Int. Cl.
*C08L 67/04* (2006.01)
*C08L 33/12* (2006.01)

(52) U.S. Cl. .......................... 525/64; 525/63; 525/186; 525/190

(58) Field of Classification Search ..................... 525/70
See application file for complete search history.

(56) References Cited

U.S. PATENT DOCUMENTS 4,057,537 A 11/1977 Sinclair 7,282,535 B2 * 10/2007 Kakeda et al. ............... 525/88

FOREIGN PATENT DOCUMENTS

| EP | 0 261 572 | | 3/1988 |
|---|---|---|---|
| JP | 59 96123 | | 6/1984 |
| JP | 6 184417 | | 7/1994 |
| JP | 7 33861 | | 2/1995 |
| JP | 2725870 | | 12/1997 |
| JP | 11279380 | * | 10/1999 |
| JP | 2002-37987 | | 2/2002 |
| JP | 2003-238788 | | 8/2003 |
| JP | 2003 253107 | | 9/2003 |
| JP | 2003 286396 | | 10/2003 |
| WO | WO02/092696 | * | 11/2002 |

OTHER PUBLICATIONS

Yanagisawa, Norio et al., "Synthesis and Physical Properties of High Molecular Weight Polylactic Acid Prepared by Direct Polycondensation", Polymer Preprints, vol. 44, No. 12, pp. 3198-3199 (with English translation).
Dunsing, Ruth et al.,"Polylactones 5. Polymerization of L,L-Lactide by Means of Magnesium Salts", Polymer Bulletin, vol. 14, pp. 491-495, 1985.
Kricheldorf, Hans R. et al.,"Mechanism of the Cationic Polymerztion of L,L-Dilactide", Macromol. Chem. vol. 187, pp. 1611-1625, 1986.

* cited by examiner

*Primary Examiner*—David Buttner
(74) *Attorney, Agent, or Firm*—Oblon, Spivak, McClelland, Maier & Neustadt, P.C.

(57) ABSTRACT

A thermoplastic resin composition comprising a polylactic acid polymer (A), an acrylic polymer (B) containing units of methyl methacrylate monomer, and a graft copolymer (C) obtained by graft-polymerizing a vinyl monomer onto a rubbery polymer, wherein the refractive index, Rc, of the graft copolymer (C) and the total refractive index, Rab, of the polylactic acid polymer (A) and the acrylic polymer (B) satisfy the following formula (1)

$$-0.004 \leq Rc - Rab \leq +0.008 \qquad (1).$$

10 Claims, No Drawings

THERMOPLASTIC RESIN COMPOSITION AND MOLDED ARTICLE COMPRISING THE SAME

TECHNICAL FIELD

The present invention relates to a thermoplastic resin composition containing a polylactic acid polymer and having excellent transparency, heat resistance and impact resistance.

BACKGROUND ART

Today, large quantities of plastic products composed of polyethylene, polypropylene, polystyrene, polyethylene terephthalate, polyvinyl chloride or the like are used and waste disposal thereof has become one of the main issues of environmental problems. More specifically, the waste disposal at present is incineration disposal or landfill disposal, and incineration disposal of polyethylene, for example, causes an incinerator to damage and shorten its life owing to large heat of combustion of polyethylene. Further, incineration disposal of polyvinyl chloride causes toxic gases to be generated.

On the other hand, in the case of landfill disposal of plastic products, the land suited for that purpose is limited. Moreover, when these plastic products are abandoned in natural environment, these will remain almost semipermanent because degradation thereof by microorganism and the like will hardly happen owing to their very high chemical stability. Consequently, the plastic products subjected to landfill disposal have caused spectacular sights to deteriorate or have become a cause of a problem such as pollution of life environment of marine organism.

Under such circumstances, nowadays, attention has been drawn to biodegradable plastics or plastics degradable under natural environment. Biodegradable plastics are known to be gradually collapsed or decomposed in soil or water through hydrolysis or biodegradation and finally changed into harmless decomposed materials by the action of microorganisms. The biodegradable plastics under investigation for practical use today are roughly classified into plastics of natural materials composed mainly of biocelluloses or starch; aliphatic polyesters; modified polyvinyl alcohols; cellulose ester compounds; modified materials of starch; and blends thereof. Among these biodegradable plastics, aliphatic polyesters can be listed as well balanced and easy to apply to various uses in view of processability, cost, mechanical characteristics, water resistance and the like.

As aliphatic polyesters, for example, poly(hydroxybutyric/valeric) acid is known as a microorganism-produced polymer; polycaprolactone or a condensate of an aliphatic dicarboxylic acid and an aliphatic diol is known as a synthesized polymer; and a polylactic acid polymer is known as a semi-synthesized polymer.

The polylactic acid polymer is synthesized from nonpetroleum raw materials such as sweet potato and corn, and is drawing public attention as a plant originated polymer which does not use petroleum resource, and, in the field where petroleum originated plastics have been exclusively used so far, the petroleum originated plastics have a trend of being vigorously replaced by polylactic acid polymers.

The polylactic acid polymer is mainly used in films or sheets by making the most of its transparency. However, the polylactic acid polymer alone, owing to its low heat resistance, can hardly replace conventional petroleum originated plastics such as transparent polyvinyl chloride or polyethylene terephthalate.

There are examples in which polycaprolactone or an inorganic filter is added to the polylactic acid polymer to improve its heat resistance, however, the excellent transparency of the polylactic acid polymer disappears in compensation for the improvement of its heat resistance.

Further, there are investigations in which an impact strength modifier is added to the polylactic acid polymer to improve its impact strength (refer to Patent Documents 1 to 2). In these cases, the excellent transparency of the polylactic acid polymer disappears, though its impact resistance is improved.

Patent Document 1: Japanese Patent No. 2,725,870
Patent Document 2: Japanese Unexamined Patent Application, First Publication No. 2003-286396

DISCLOSURE OF INVENTION

Problems to be Solved by the Invention

It is, accordingly an object of the present invention to provide a thermoplastic resin composition having both heat resistance and impact resistance while making the most of the excellent transparency of a polylactic acid polymer.

Means for Solving Problem

The gist of the thermoplastic resin composition of the present invention resides in a thermoplastic resin composition comprising: a polylactic acid polymer (A); an acrylic polymer (B) containing a methyl methacrylate monomer unit; and a graft copolymer (C) obtained by graft-polymerizing a vinyl monomer onto a rubbery polymer, wherein the refractive index, Rc, of the graft copolymer (C) and the total refractive index, Rab, of the polylactic acid polymer (A) and the acrylic polymer (B) satisfy the following formula (1).

$$-0.004 \leq Rc-Rab \leq +0.008 \tag{1}$$

Further, it is preferable that the compositional ratio of the polylactic acid polymer (A) to the acrylic polymer (B) is within the range of from 1/99 to 99/1 (mass ratio).

Furthermore, it is preferable that 1 to 50 parts by mass of the graft copolymer (C) to 100 parts by mass of the total of the polylactic acid polymer (A) and the acrylic polymer (B) is blended.

Moreover, it is preferable that the graft copolymer (C) is obtained by using a silicone rubber containing a polyorganosiloxane or an acrylic rubber containing a polyalkyl (meth) acrylate rubber as the rubbery polymer.

Further, the gist of the molded article of the present invention resides in a molded article obtained by molding the thermoplastic resin composition.

Further, it is preferable that total light transmittance of the aforementioned molded article is 65% or more.

Furthermore, it is preferable that haze of the aforementioned molded article is 60% or less.

Effect of the Invention

According to the present invention, a molded article having excellent transparency, heat resistance and impact resistance at the same time can be obtained. Such a molded article is particularly suitably used in building materials, automobiles, toys, general merchandise such as stationery goods and further in automobile parts, OA devices and domestic appliances.

BEST MODE FOR CARRYING OUT THE INVENTION

Hereinafter, the present invention will be explained in detail.

The thermoplastic resin composition of the present invention comprises a polylactic acid polymer (A); an acrylic polymer (B) containing a methyl methacrylate monomer unit; and a graft copolymer (C) obtained by graft-polymerizing a vinyl monomer onto a rubbery polymer, wherein the refractive index, Rc, of the graft copolymer (C) and the total refractive index, Rab, of the polylactic acid polymer (A) and the acrylic polymer (B) satisfy the following formula (1).

$$-0.004 \leq Rc-Rab \leq +0.008 \quad (1)$$

The refractive index, Rc, of the graft copolymer (C) in the present invention can be measured with Abbe's refractometer.

Further, the total refractive index, Rab, of the polylactic acid polymer (A) and the acrylic polymer (B) means the value obtained by previously mixing the polylactic acid polymer and the acrylic polymer, which compose the resin composition, with their compositional ratio and by measuring refractive index thereof with Abbe's refractometer.

By making the difference between these refractive indices fall within the aforementioned fixed range, a resin composition which can provide a molded article having excellent transparency and further having excellent heat resistance and impact strength can be obtained.

<Polylactic Acid Polymer (A)>

As the polylactic acid polymer (A) to be used in the present invention, polylactic acid or a lactic acid copolymer obtained by copolymerization of lactic acid with other component(s) can be used. Further, a mixture of these polymers can also be used.

Polylactic acid can be synthesized by a conventionally publicly known method. For example, a method of direct dehydration condensation of lactic acid such as those described in Japanese Unexamined Patent Application, First Publication No. H7-033861, Japanese Unexamined Patent Application, First Publication No. S59-096123 or Preprint Kobunshi Toronkai, Vol. 44, p. 3198-p. 3199 or a method of ring-opening polymerization of lactide which is a cyclic dimmer of lactic acid can be listed.

When the direct dehydration condensation is carried out, any one of L-actic acid, D-lactic acid, DL-lactic acid and a mixture thereof can be used. Further, when the ring-opening polymerization is carried out, any one of L-lactide, D-lactide, DL-lactide and a mixture thereof can be used.

Synthesis, purification and polymerization procedure of lactide are described in various documents such as, for example, U.S. Pat. No. 4,057,537, EP 261,572 A1, Polymer Bulletin, Vol. 14, p. 491-p. 495 (1985) and Makromol Chem., Vol. 187, p. 1611-p. 1628 (1986).

The constitutional molar ratio (L/D) of L-lactic acid unit to D-lactic acid unit in polylactic acid may be any one of 100/0 to 0/100. L/D is preferably 100/0 to 60/40, more preferably 100/0 to 80/20.

Lactic acid copolymer is a copolymerized material of lactic acid monomer or lactide with other copolymerizable component(s). As the other copolymerizable components, a compound having two or more functional groups which tend to form ester linkage such as a dicarboxylic acid, a polyol, a hydroxycarboxylic acid or a lactone can be listed. As the dicarboxylic acid, for example, succinic acid, azelaic acid, sebacic acid, terephthalic acid, isophthalic acid can be listed.

As the aforementioned polyol, for example, an aromatic polyol such as that obtained by addition reaction of ethylene oxide to bisphenol A; an aliphatic polyol such as ethylene glycol, propylene glycol, butane diol, hexane diol, octane diol, glycerin, sorbitan, trimethylolpropane or neopentyle glycol; or an ether glycol such as diethylene glycol, triethylene glycol, polyethylene glycol or polypropylene glycol can be listed.

As the aforementioned hydroxycarboxylic acid, for example, glycolic acid, hydroxybutylcarboxylic acid, 3-hydroxybutyric acid, 4-hydroxybutyric acid, 3-hydroxyvaleric acid, 4-hydroxyvaleric acid, 6-hydroxycaproic acid and those described in Japanese Unexamined Patent Application, First Publication No. H6-184417 can be listed.

As the lactone, for example, glycolide, ε-caprolactone glycolide, ε-aprolactone, β-propiolactone, δ-butyrolactone, β- or γ-butyrolactone, pyvalolactone and δ-valerolactone can be listed.

Biodegradability of the lactic acid copolymer is affected by content of lactic acid unit in the copolymer. Therefore, the content of lactic acid unit in the lactic acid copolymer is, though it depends on other copolymerizable component(s) to be used, preferably 50 mol % or more, more preferably 70 mol % or more. By the content of lactic acid unit or by other copolymerizable components, mechanical characteristics or biodegradability of the product to be obtained can be improved.

The polylactic acid polymer (A) is not particularly limited, however, in the case that the polymer is a crystalline one, normally, the polymer with its melting point of 60° C. to 200° C. and with its mass average molecular mass of 50,000 to 500,000 is preferably used. The polymer with its mass average molecular mass of 100,000 to 300,000 is more preferably used.

Further, for the purpose of obtaining the same effect as using the lactic acid copolymer, polylactic acid and another aliphatic polyester may simply be blended. In this case, content of polylactic acid contained in the blend is preferably, calculated in terms of mol, 50 mol % or more, more preferably 70 mol % or more.

As the polylactic acid polymer (A), those on the market can be used, and for example, LACEA [H-100], [H-400], [H-100J] manufactured by MITSUI CHEMICALS, INC. can be listed.

<Acrylic Polymer (B)>

The acrylic polymer (B) is a polymer containing methyl methacrylate monomer unit and a homopolymer of methyl methacrylate or a copolymer of methyl methacrylate and a monomer copolymerizable with methyl methacrylate can be used. When the copolymer is used, it preferably contains methyl methacrylate monomer unit of 50 mass % or more, more preferably 70 mass % or more.

As the other monomers copolymerizable with methyl methacrylate, alkyl acrylates such as methyl acrylate, ethyl acrylate and butyl acrylate; other alkyl methacrylates such as ethyl methacrylate and butyl methacrylate can be listed.

Further, the acrylic polymer (B) in which, as the monomer copolymerizable with methyl methacrylate, an aromatic vinyl monomer such as styrene, a vinyl cyanide monomer such as acrylonitrile, cyclohexyl maleimide, phenyl maleimide, maleic anhydride, glutaric anhydride or the like is copolymerized can also be used.

From the viewpoint of excellent transparency and heat resistance, a copolymer of methyl methacrylate and methyl acrylate selected among the aforementioned monomer is preferably used.

The method for producing the acrylic polymer (B) is not particularly limited, and various publicly known methods such as suspension polymerization, bulk polymerization and emulsion polymerization can be applied. Molecular weight of the acrylic polymer (B) is not particularly limited, however, mass average molecular mass of 60,000 to 300,000 is preferable.

As the acrylic polymer (B), those on the market can be used, and for example, ACRYPET [VH], [MF], [MD], [UT-100] manufactured by MITSUBISHI RAYON CO., LTD. can be listed.

Further, as the acrylic polymer (B) in which phenyl maleimide is copolymerized, for example, PMI RESIN [P35S], [P60S] manufactured by MITSUBISHI RAYON CO., LTD. can be listed.

<Graft Copolymer (C)>

The graft copolymer (C) in the present invention is a graft copolymer (C) in which a vinyl monomer is graft-polymerized onto a rubbery polymer.

The rubbery polymer to be used in the graft copolymer of the present invention is roughly classified into a silicone rubber containing a polyorganosiloxane or an acrylic rubber containing a polyalkyl (meth)acrylate rubber. The method for producing these components is not particularly limited, however, emulsion polymerization is most suitable.

The vinyl monomer to be used in the graft polymerization is not particularly limited, however, it is preferably at least one kind selected from an aromatic alkenyl compound, a methacrylate, an acrylate and a vinyl cyanide compound in order to adjust refractive index of the graft copolymer (C).

(Silicone Rubber Based Graft Copolymer)

The silicone rubber to be used in the present invention includes a polyorganosiloxane rubber and a silicone/acryl compound rubber compounded with a polyorganosiloxane and an acrylic rubber, however, the silicone/acryl compound rubber is preferably used from the viewpoint of transparency and impact resistance.

As the poly(organosiloxane/acryl) compound rubber, it is preferable that a polyorganosiloxane component is in the range of 1 to 99% by mass and a polyalkyl (meth)acrylate rubber component is in the range of 99 to 1% by mass (sum of the both components is 100% by mass).

The method for producing the poly(organosiloxane/acryl) compound rubber is not particularly limited, however, a method in which a latex of the polyorganosiloxane is prepared by emulsion polymerization at first and then a monomer which is the constituent of the polyalkyl (meth)acrylate rubber is impregnated into a particle of the polyorganosiloxane latex followed by polymerizing the monomer is preferable.

The polyorganosiloxane component can also be prepared through emulsion polymerization using an organosiloxane and a cross-linking agent (CI). In this case, further, a graft-linking agent (GI) can be simultaneously used.

As the organosiloxane, various cyclic compounds composed of three-membered ring or more can be listed, which include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. Among them, cyclic compounds composed of three- to six-membered ring compounds are preferably used. These compounds can be used alone or as a mixture of two or more kinds. The amount to be used of the organosiloxane in the components of the polyorganosiloxane is preferably 50% by mass or more, more preferably 70% by mass or more.

As the cross-linking agent (CI), a trifunctional or tetrafunctional silane cross-linking agent can be listed, which includes trimethoxymethylsilane, triethoxyphenylsilane, tetramethoxysilane, tetraethoxysilane, tetra-n-propoxysilane, tetrabutoxysilane or the like. In particular, tetrafunctional cross-linking agents are preferable, and among them, tetraethoxysilane is particularly preferable. The amount to be used of the cross-linking agent in the polyorganosiloxane component is preferably 0.1 to 30% by mass.

As the graft-linking agent (GI), a compound which can form a unit represented by the following formulae can be listed.

$$CH_2=C(R^2)-COO-(CH_2)_p-SiR^1{}_nO_{(3-n)/2} \quad (GI-1)$$

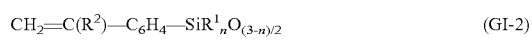
$$CH_2=C(R^2)-C_6H_4-SiR^1{}_nO_{(3-n)/2} \quad (GI-2)$$

$$CH_2=CH-SiR^1{}_nO_{(3-n)/2} \quad (GI-3)$$

$$HS-(CH_2)_p-SiR^1{}_nO_{(3-n)/2} \quad (GI-4)$$

(In these formulae, $R^1$ represents methyl group, ethyl group, propyl group or phenyl group; $R^2$ represents hydrogen atom or methyl group; n is 0, 1 or 2; and p is a number of 1 to 6.)

(Meth)acryloyloxysiloxane which can form a unit of the above formula (GI-1) can form an effective graft chain owing to its high graft efficiency and is advantageous to realize impact resistance.

As the compound which can form a unit of the above formula (GI-1), methacryloyloxysiloxane is particularly preferable. A concrete example of methacryloyloxysiloxane includes β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, γ-methacryloyloxybutyldiethoxymethylsilane or the like.

As the compound which can form a unit of the above formula (GI-2), vinylsiloxane can be listed, which concretely includes tetramethyltetravinylcyclotetrasiloxane.

As the compound which can form a unit of the above formula (GI-3), p-vinylphenyl-dimethoxymethylsilane can be listed.

As the compound which can form a unit of the above formula (GI-4), γ-mercaptopropyldimethoxymethylsilane, γ-mercaptopropylmethoxydimethylsilane, γ-mercaptopropyldiethoxymethylsilane or the like can be listed.

The amount to be used of the graft-linking agent in the polyorganosiloxane component is preferably 0 to 10% by mass; more preferably 0.5 to 5% by mass.

In order to produce latex of the polyorganosiloxane component, a method, for example, described in U.S. Pat. No. 2,891,920 or U.S. Pat. No. 3,294,725 can be used. In the present invention, the latex is preferably produced by a method in which a mixed solution of an organosiloxane, a cross-linking agent (CI) and, when it is necessary, a graft-linking agent (GI) is mixed with water under shearing by using, for example, a homogenizer in the presence of a sulfonic acid emulsifying agent such as alkylbenzenesulfonic acid, alkylsulfonic acid or the like. Alkylbenzenesulfonic acid is preferable because it serves as a polymerization initiator as well as an emulsifying agent of organosiloxane. At this time, simultaneously using a metal alkylbenzenesulfonate or a metal alkylsulfonate is preferable because they are effective in stably maintaining a polymer at the time of graft polymerization.

The polyalkyl (meth)acrylate rubber component can be synthesized by using an alkyl (meth)acrylate, a cross-linking agent (CII) and a graft-linking agent (GII).

As the alkyl (meth)acrylate, for example, an alkyl acrylate such as methyl acrylate, ethyl acrylate, n-propyl acrylate, n-butyl acrylate, 2-ethylhexyl acrylate or the like; an alkyl methacrylate such as hexyl methacrylate, 2-ethylhexyl methacrylate, n-lauryl methacrylate; or the like can be listed, and in particular, n-butyl acrylate is preferable.

As the cross-linking agent (CII), for example, ethylene glycol dimethacrylate, propylene glycol dimethacrylate, 1,3-butylene glycol dimethacrylate, 1,4-butylene glycol dimethacrylate or the like can be listed.

As the graft-linking agent (GII), for example, allyl methacrylate, triallyl cyanurate, triallyl isocyanurate or the like can be listed. Allyl methacrylate can also be used as a cross-linking agent. These cross-linking agent and graft-linking agent can be used alone or in combination of two or more kinds. The total amount to be used of these cross-linking agent and graft-linking agent in the alkyl (meth)acrylate rubber component is preferably 0.1 to 20% by mass.

Production of the polyalkyl (meth)acrylate rubber component can be carried out, for example, as in the following manner.

To a latex of the polyorganosiloxane component which has been neutralized by an addition of an alkaline aqueous solution such as sodium hydroxide, potassium hydroxide, sodium carbonate or the like, the above-mentioned alkyl (meth)acrylate, cross-linking agent (CII) and graft-linking agent (GII) are added and these are impregnated into the polyorganosiloxane particle. Then, polymerization is carried out by subjecting a normal radical polymerization initiator to act on the system. With the progress of polymerization, a latex of a compound rubber made from the polyorganosiloxane component and the polyalkyl (meth)acrylate rubber component can be obtained.

The poly(organosiloxane/acryl) compound rubber thus produced by emulsion polymerization is capable of graft copolymerization with a vinyl monomer.

Gel content of the poly(organosiloxane/acryl) compound rubber as measured by extracting with toluene at 90° C. for 4 hours is preferably 80% by mass or more.

In the present invention, the compound rubber with a main frame of the polyorganosiloxane rubber component having recurring units of dimethylsiloxane and with a main frame of the polyalkyl (meth)acrylate rubber component having recurring units of n-butyl acrylate is preferably used.

A poly(organosiloxane/acryl) compound rubber-containing graft copolymer composed of the poly(organosiloxane/acryl) compound rubber and a grafted portion can be obtained by graft polymerizing at least one vinyl monomer in the presence of the poly(organosiloxane/acryl) compound rubber mentioned above.

The vinyl monomer composing the grafted portion is not particularly limited, concrete examples of which include various vinyl monomers like aromatic alkenyl compounds such as styrene, α-methyl styrene and vinyl toluene; methacrylates such as methyl methacrylate and 2-ethylhexyl methacrylate; acrylates such as methyl acrylate, ethyl acrylate and n-butyl acrylate; vinyl cyanides such as acrylonitrile and methacrylonitrile. The vinyl monomers can be used alone or in combination of two or more kinds.

To control the refractive index, Rc, of the silicone rubber based graft copolymer (C) and the total refractive index, Rab, of the polylactic acid polymer (A) and the acrylic polymer (B) to fall within the desired range, the following method is used. That is, for example, to a resin composition having high Rab value caused by containing a large amount of the acrylic polymer (B), it is preferable to use the graft copolymer obtained by using the poly(organosiloxane/acryl) compound rubber which has higher refractive index than the polyorganosiloxane rubber. In this case, the refractive index, Rc, of the graft copolymer can be made further higher by using a larger amount of the polyalkyl (meth)acrylate rubber component such as methyl acrylate, ethyl acrylate, n-propyl acrylate, n-butyl acrylate, 2-ethylhexyl acrylate or the like.

On the contrary, in the case that the refractive index, Rc, of the graft copolymer is needed to be lowered in accordance with Rab, the refractive index, Rc, can be lowered by using a smaller amount of the polyalkyl (meth)acrylate rubber component.

Further, by adjusting a kind or an amount of a vinyl monomer to be graft copolymerized onto the rubbery polymer, the refractive index, Rc, of the graft copolymer (C) can also be adjusted.

(Acrylic Rubber Based Graft Copolymer)

The acrylic rubber to be used for producing the graft copolymer in the present invention is a rubber obtained by polymerizing a (meth)acrylate monomer or its mixture containing it as a main component.

As the (meth)acrylate monomer, it is not particularly limited, however, a (meth)acrylate is normally used. A concrete example of it includes methyl acrylate, ethyl acrylate, n-propyl acrylate, n-butyl acrylate, 2-ethylhexyl acrylate, octyl acrylate, tridecyl acrylate, ethoxyethoxyethyl acrylate, methoxytripropyleneglycol acrylate, 4-hydroxybutyl acrylate, lauryl acrylate, lauryl methacrylate, stearyl methacrylate or the like. These are used alone or in combination of two or more kinds.

The acrylic rubber is preferably a polymer having a glass transition temperature of 0° C. or less in point of realization of impact resistance, and hence, as the (meth)acrylate monomer, in particular, an alkyl (meth)acrylate such as n-butyl acrylate, 2-ethylhexyl acrylate, octyl acrylate, lauryl acrylate, tridecyl acrylate, lauryl methacrylate, tridecyl methacrylate or the like is preferable. Further, when a (meth)acrylate having crystallizing property around room temperature (for example, stearyl methacrylate or the like) is used, it is preferably used as a mixture with a monomer which has an ability to dissolve it.

The acrylic rubber may be a (co)polymer obtained by merely polymerizing at least one monomer, however, it is preferably a compound rubber which can realize a better physical property in impact strength at low temperature.

A suitable example of the compound rubber is a compound rubber having, as its main component, acrylic rubber component (AR1) which contains a unit originating from at least one kind of a (meth)acrylate of an alcohol which has a branched chain or an alkyl group having carbon number of 13 or more or a (meth)acrylate containing hydroxyl group, methoxy group or ethoxy group, and acrylic rubber component (AR2) which contains a unit originating from n-butyl acrylate, wherein glass transition temperature (Tg1) originating from the acrylic rubber component (AR1) is lower than glass transition temperature (Tg2) originating from the acrylic rubber component (AR2). Such a compound rubber can give higher impact resistance at low temperature than a simple copolymer type rubber does.

As the (meth)acrylate which composes the acrylic rubber component (AR1), in particular, 2-ethylhexyl acrylate, ethoxyethyl acrylate, methoxytripropyleneglycol acrylate, 4-hydroxybutyl acrylate, tridecyl methacrylate, tridecyl acrylate, stearyl methacrylate and stearyl acrylate are preferable.

Further, the compound rubber normally contains 5 to 95% by mass of the acrylic rubber component (AR1) and 95 to 5% by mass of the acrylic rubber component (AR2), and preferably contains 10 to 90% by mass of the acrylic rubber component (AR1) and 90 to 10% by mass of the acrylic rubber component (AR2), more preferably contains 10 to 80% by mass of the acrylic rubber component (AR1) and 90 to 20% by mass of the acrylic rubber component (AR2). These ranges are significant in point of predominance to the copolymer type rubber.

The monomer to be used to obtain the acrylic rubber normally contains a monomer having two or more unsaturated bonds in its molecule, the content of which is preferably 2% by mass or less, more preferably 1.5% by mass or less. The monomer having two or more unsaturated bonds in its molecule functions as a cross-linking agent or a graft-linking agent. As the cross-linking agent, for example, ethylene glycol dimethacrylate, propylene glycol dimethacrylate, 1,3-butylene glycol dimethacrylate, 1,4-butylene glycol dimethacrylate, divinylbenzene and polyfunctional methacryloyl group-modified silicone can be listed. As the graft-linking agent, for example, allyl methacrylate, triallyl cyanurate and triallyl isocyanurate can be listed. Allyl methacrylate can also be used as a cross-linking agent. These cross-linking agent and graft-linking agent can be used alone or in combination of two or more kinds.

Further, when the compound rubber is used as the acrylic rubber, the preferable amount of use of the cross-linking agent or the graft-lining agent to the acrylic rubber component (AR1) and the acrylic rubber component (AR2) is such that the amount to be used to the component (AR2) is larger than the amount to be used to the component (AR1) based on the amount of use (% by mass) of the cross-linking agent or the graft-linking agent to each component.

The acrylic rubber may have two or more glass transition temperatures below 10° C. In this case, it is preferable that glass transition temperature (Tg1) originating from the acrylic rubber component (AR1) is lower than glass transition temperature (Tg2) originating from the acrylic rubber component (AR2). When glass transition temperature satisfies such a condition, the graft copolymer obtained realizes higher impact resistance. This is a characteristic of a compound rubber and a difference as compared with a simple copolymer type rubber.

Glass transition temperature of the acrylic rubber is measured as transition point Tan δ by using Dynamic Mechanical Analyzer (hereinafter expressed as DMA). Normally, a polymer obtained from a monomer has an inherent glass transition temperature and, in the case of a single polymer (a homopolymer Or a random copolymer composed of plural monomers), one transition point is observed, however, in the case of a mixture of plural polymers or a compound polymer, transition points inherent to all components are observed. For example, in the case that a polymer composition comprises two polymers, two transition points are observed by measurement. Two peaks are observed in the Tan δ curve measured with DMA. In the case that there is a deviation in compositional ratio or transition temperatures are near, it sometimes happens that each peak comes near and a peak with shoulder is observed, however, this can be distinguished because it is different from a curve with one simple peak observed in the case of the single polymer.

When a mixture of the (meth)acrylate monomer and other monomers is copolymerized, as other monomers, for example, an aromatic alkenyl compound such as styrene, α-methyl styrene or vinyl toluene; a vinyl cyanide compound such as acrylonitrile or methacrylonitrile; a vinyl monomer such as a methacrylic acid-modified silicone or fluorine-containing vinyl monomer may be contained as a copolymerizable component. The amount of use of other monomer(s) is preferably 30% by mass or less.

When the acrylic rubber is produced, various conventionally known surfactants such as anionic, nonionic or cationic surfactant can be used as emulsifier or dispersion stabilizer. Further, if it is necessary, these can be used in combination of two or more kinds of surfactant.

Further, as the acrylic rubber, a copolymerized rubber obtained by copolymerizing a (meth)acrylate monomer and a diene monomer can also be used. In this case, the (meth)acrylate monomer is not particularly limited, however, normally, the above-mentioned (meth)acrylate is used. Further, as the diene monomer, 1,3-butadiene, isoprene, chloroprene or the like can be listed.

As the compositional ratio of the (meth)acrylate monomer and the diene monomer, it is preferable that the diene monomer of not more than 45% by mass to the total monomer of 100 parts by mass is added. If the content exceeds 45% by mass, refractive index of the resultant polymer becomes high and transparency thereof is deteriorated.

Further, at this time, other vinyl monomers which are copolymerizble with the (meth)acrylate monomer and the diene monomer can also be copolymerized. The concrete example of such vinyl monomer includes, for example, an aromatic vinyl monomer such as styrene or α-methyl styrene; an unsaturated nitrile such as acrylonitrile or methacrylonitrile; a vinyl ether such as methyl vinyl ether or butyl vinyl ether; a vinyl halide such as vinyl chloride or vinyl bromide; a vinylidene halide such as vinylidene chloride or vinylidene bromide; a vinyl monomer having a glycidyl group such as glycidyl acrylate, glycidyl methacrylate, allyl glycidyl ether or ethylene glycol glycidyl ether; or a polyfunctional monomer such as divinylbenzene, ethylene glycol dimethacrylate or 1,3-butylene glycol dimethacrylate. Further, these vinyl monomers can be used alone or in combination of two or more kinds.

An acrylic rubber based graft copolymer which is composed of an acrylic rubber and a grafted portion can be obtained by graft polymerizing at least one vinyl monomer in the presence of the acrylic rubber explained in the above.

The vinyl monomer composing the grafted portion is not particularly limited, the concrete example of which includes various vinyl monomers like an aromatic alkenyl compound such as styrene, α-methyl styrene, vinyl toluene or the like; a methacrylate such as methyl methacrylate, 2 ethylhexyl methacrylate or the like; an acrylate such as methyl acrylate, ethyl acrylate, n-butyl acrylate or the like; a vinyl cyanide such as acrylonitrile, methacrylonitrile or the like. These vinyl monomers can be used alone or in combination of two or more kinds. The amount of use of these monomers is preferably 20% by mass or less.

The vinyl monomer may contain a vinyl monomer having two or more unsaturated bonds in its molecule from the viewpoint of impact resistance and heat resistance. The concrete example includes a monomer functioning as a cross-linking agent such as- ethylene glycol dimethacrylate, propylene glycol dimethacrylate, 1,3-butylene glycol dimethacrylate, 1,4-butylene glycol dimethacrylate, divinylbenzene or polyfunctional methacryloyl group-modified silicone; and a monomer functioning as a cross-linking agent and/or a graft-linking agent such as allyl methacrylate, triallyl cyanurate or triallyl isocyanurate.

The graft portion can be produced by a single stage or a multistage polymerization. Impact resistance can be improved by using the multistage polymerization in the production of the graft portion, though it depends on how dispersibility or interfacial strength of the graft copolymer (C) in the matrix is planned. For example, in the case that the graft portion contains a reactive monomer unit such as glycidyl methacrylate, it is an effective measure to produce the graft portion by using a multistage polymerization as a method for keeping the dispersibility of the graft copolymer well while maintaining the reactivity of glycidyl methacrylate. However, it is not preferable to multiply the stage uselessly because the production step increases and hence the productivity is lowered. Therefore, the multistage polymerization is preferably 5 stages or less, more preferably 3 stages or less.

As the polymerization method for producing the graft portion, it is possible to use a conventional dropping polymerization. When the first production stage of the acrylic rubber is carried out without emulsifier, it is preferable to use a method in which components giving the graft portion are fed collectively in the presence of the acrylic rubber, and then, a catalyst is added and polymerization is carried out. By this method, agglomerated particles become hard to fuse when they are recovered as powder. Further, in the case of the multistage polymerization, the components may be fed either collectively or drop wise after the first stage As the ratio of the acrylic rubber to the graft portion in the graft copolymer, the amount of the acrylic rubber is preferably 80 to 99 parts by mass based on the sum of the both as 100 parts by mass, more preferably 80 to 95 parts by mass, and particularly preferably 80 to 90 parts by mass. When the amount of the graft portion is 1 part by mass or more, dispersibility of the graft copolymer thus obtained in a thermoplastic resin composition becomes good and processability of the thermoplastic resin composition is improved. On the other hand, when the amount of the graft portion is 20 pats by mass or less, realization of impact strength of raft copolymer is improved.

In order to control the refractive index, Rc, of the acrylic rubber based graft copolymer (C) and the total refractive index, Rab, of the polylactic acid polymer (A) and the acrylic polymer (B) to fall within the desired range, the following method is used. Namely, for example, to a resin composition having high Rab value caused by containing a large amount of the acrylic polymer (B), the refractive index of the acrylic rubber based graft copolymer is increased by using a larger amount of a (meth)acrylate monomer which gives a polymer with higher refractive index as a (meth)acrylate monomer to be used in a rubbery polymer.

On the contrary, in the case that the refractive index, Rc, of the graft copolymer is needed to be lowered in accordance with Rab, the refractive index, Rc, can be lowered by using a (meth)acrylate monomer which gives a polymer with lower refractive index in the rubbery polymer.

Further, the refractive index, Rc, of the graft copolymer (C) can also be adjusted by controlling a kind or an amount of the vinyl monomer to be graft polymerized onto the rubbery polymer.

The graft copolymer (C) is normally obtained as latex. The graft copolymer (C) obtained as latex is preferably recovered in the form of powder or granule by spray drying or wet coagulation using coagulant such as an acid or a salt. However, in the case that a functional group is included in the graft copolymer, wet coagulation using an acid is not preferable. When the acid is used, the functional group is sometimes deactivated or bad influence is sometimes exerted. In the case that wet coagulation using a salt is carried out, it is preferable to use an alkaline earth metal salt such as calcium acetate, calcium chloride, magnesium sulfate or the like. When an alkaline earth metal is used, deterioration of the matrix resin such as decomposition by water or heat can be suppressed as much as possible. When deterioration of the matrix resin is suppressed, resistance to moist heat of a molded article composed of a thermoplastic resin composition is improved. Resistance to moist heat affects the realization of impact strength of a molded article, and hence, greatly affects recycle ability of the molded article.

Further, as a recovery method in view of recycle ability, spray drying which does not contain a salt for a coagulant is effective. When spray drying is carried out, a filler or another polymer together with the graft copolymer are spray dried simultaneously and mixed powder of all can be recovered. By selecting a kind of component to be spray dried simultaneously, better processability of the resultant powder can also be realized. As a component to be spray dried simultaneously, calcium component, silica, rigid vinyl copolymer or the like can be listed.

<Thermoplastic Resin Compositions>

The thermoplastic resin composition of the present invention comprises at least a polylactic acid polymer (A), an acrylic polymer (B) and a graft copolymer (C).

The compositional ratio of the polylactic acid polymer (A) to the acrylic polymer (B) is 1/99 to 99/1 (mass ratio), preferably 5/95 to 95/5 (mass ratio). When the amount of the polylactic acid polymer (A) becomes 1% by mass or less, the effect of reducing the load on natal environment becomes small, and when the amount of the acrylic polymer (B) becomes 1% by mass or less, the effect of improving heat resistance becomes small.

The amount of addition of the graft copolymer (C) is not particularly limited, however, normally, it is preferably 1 to 50 parts by mass to 100 parts by mass of the sum of the polylactic acid polymer (A) and the acrylic polymer (B), more preferably 1 to 30 parts by mass.

Further, in the present invention, another thermoplastic resin can be further added as long as it does not deteriorate transparency of the thermoplastic resin composition, which includes styrene based resin such as polystyrene, HIPS, ABS, AS, MS or the like, polyphenylene ether based resin, polycarbonate based resin, polyester based resin, polyacetal based resin, polyvinyl chloride based resin, polyolefin based resin such as polyethylene, polypropylene or the like.

The amount of addition of these polymers is preferably 10 parts by mass or less to 100 parts by mass of the sum of the polylactic acid polymer (A) and the acrylic polymer (B), more preferably 5 parts by mass, however, most preferably 0 part by mass from the viewpoint of transparency.

When the thermoplastic resin composition of the present invention is prepared, various conventionally known fire retardants, stabilizers, fillers can be added at a desired stage such as compounding, kneading, molding or the like with respect to thermoplastic resin as long as they do not deteriorate physical properties of the original thermoplastic resin composition.

The flame retardant which can be used to the thermoplastic resin composition of the present invention is not particularly limited, however, a halogen based flame retardant, a phosphoric acid based flame retardant or silicone based flame retardant is preferably used because it can realize excellent flame retardance without deteriorating impact resistance or the like. Such a flame retardant includes, for example, a halogen-containing compound, a phosphoric acid based compound, a silicone based compound or a halogen-containing organometallic salt based compound.

A concrete example of the flame retardant includes a phosphoric acid based compound such as a phosphate compound, a phosphite compound, a condensated phosphate compound or the like; aluminum hydroxide; an antimony compound such as antimony trioxide, antimony pentoxide or the like; a halogen-containing compound such as a halogen-containing phosphate compound, a halogen-containing condensated phosphate compound, chlorinated paraffin, a brominated aromatic compound like brominated aromatic triazine, brominated phenylalkyl ether or the like; sulfone or a sulfate based compound; epoxy based reactive flame retardant or the like.

The amount of addition of the flame retardant is preferably 10 pars by mass or less to 100 parts by mass of the sum of the polylactic acid polymer (A) and the acrylic polymer (B), more preferably 5 parts by mass, however, most preferably 0 part by mass from the viewpoint of transparency.

As the stabilizer, a metal based stabilizer and the other stabilizer can be listed. The metal based stabilizer includes, for example, a lead based stabilizer such as tribasic lead sulfate, dibasic lead phosphite, basic lead sulfite, lead silicate or the like; a metal soap based stabilizer derived from a metal such as potassium, magnesium, barium, zinc, cadmium, lead or the like and an aliphatic acid such as 2-ethylhexanoic acid, lauric acid, myristic acid, palmitic acid, stearic acid, isostearic acid, hydroxystearic acid, oleic acid, ricinoleic acid, linoleic acid, behenic acid or the like; an organotin based stabilizer derived from an alkyl group, an ester group or the like and an aliphatic acid salt, a maleate, a sulfide-containing compound or the like; a composite metal soap based stabilizer such as Ba—Zn based, Ca—Zn based, Ba—Ca—Sn based, Ca—Mg—Sn based, Ca—Zn—Sn based, Pb—Sn based, Pb—Ba—Ca based or the like; a metal salt based stabilizer derived from a metal such as barium, zinc or the like and normally two or more kinds of organic acids selected from a branched aliphatic acid such as 2-ethylhexanoic acid, isodecanoic acid, trialkyl acetic acid or the like, an unsaturated aliphatic acid such as oleic acid, ricinoleic acid, linoleic acid or the like, a cyclic aliphatic acid such as naphthenic acid or the like, and an aromatic acid such as phenol, benzoic acid, salicylic acid, a substituted derivative thereof or the like; a liquid metal salt stabilizer in which the above-mentioned stabilizer is dissolved in an organic solvent such as a petroleum hydrocarbon, an alcohol, a glycerin derivative or the like, and a stabilizer assistant such as a phosphite, an epoxy compound, a color development inhibitor, a transparency modifier, a light stabilizer, an antioxidant, a plate out inhibitor or a lubricant is further added.

The other stabilizer includes an epoxy compound such as an epoxy resin, an epoxidized soybean oil, an epoxidized vegetable oil, an epoxidized aliphatic acid alkyl ester or the like; an organic phosphite in which phosphorous is substituted by alkyl group, aryl group, cycloalkyl group, alkoxyl group or the like and a dihydric alcohol such as propylene glycol or the like or an aromatic compound such as hydroquinone, bisphenol A or the like is contained; an ultraviolet light absorber like 2,4-di-t-butyl-3-hydroxy toluene (BHT), a hindered phenol such as a dimerized bisphenol dimerized by sulfur or methylene group, a salicylate, benzophenone, benzotriazole or the like; a light stabilizer such as a hindered amine or a nickel complex salt; an ultraviolet screener such as carbon black, rutile titanium dioxide or the like; a polyol such as trimethylolpropane, pentaerythritol, sorbitol, mannitol or the like; a nitrogen-containing compound such as β-amino crotonic acid ester, 2-phenyl indole, diphenylthiourea, dicyandiamide or the like; a sulfur-containing compound such as dialkylthio dipropionate or the like; a keto compound such as an acetoacetic ester, dehydroacetic acid, β-diketone or the like; an organosilicon compound; a borate or the like. These stabilizers can be used alone or in combination of two or more kinds.

The amount of use of the stabilizer is preferably 5 parts by mass or less to 100 parts by mass of the sum of the polylactic acid polymer (A) and the acrylic polymer (B) from the viewpoint of transparency, more preferably 2 parts by mass, however, most preferably 0 part by mass from the viewpoint of transparency.

As the filler, for example, a carbonate such as calcium carbonate heavy, precipitated calcium carbonate, colloidal calcium carbonate or the like; an inorganic filler such as titanium oxide, clay, talk, mica, silica, carbon black, graphite, glass beads, glass fiber, carbon fiber, metal fiber or the like; an organic filler like an organic fiber such as polyamide or the like, silicone or the like; or a natural organic material such as wood flour or the like can be listed. In particular, a fiber reinforced resin composition containing a fibrous reinforcer such as glass fiber or carbon fiber is very useful.

The amount of use of the filler is preferably 5 parts by mass or less to 100 parts by mass of the sum of the polylactic acid polymer (A) and the acrylic polymer (B) from the viewpoint of transparency, more preferably 3 parts by mass, however, most preferably 0 part by mass from the viewpoint of transparency.

To the thermoplastic resin composition of the present invention, a processing aid, a plasticizer, a lubricant, a flame retardant, a heat resistance improver, a mold releasing agent, a crystalline nucleating agent, a flowability modifier, a coloring agent, an antistatic agent, an electric conductivity modifier, a surfactant, an anti-fogging agent, a foaming agent, an anti-fungus agent or the like can be added.

As the processing aid, for example, a (meth)acrylate based copolymer or the like can be listed.

The amount of use of the processing aid is preferably 15 parts by mass or less to 100 parts by mass of the sum of the polylactic acid polymer (A) and the acrylic polymer (B) from the viewpoint of transparency, more preferably 5 parts by mass, however, most preferably 0 part by mass from the viewpoint of transparency.

As the plasticizer, for example, an alkyl ester of an aromatic polybasic acid such as dibutyl phthalate, dioctyl phthalate, diisodecyl phthalate, diisononyl phthalate, diundecyl phthalate, trioctyl trimellitate, triisooctyl trimellitate or the like; an alkyl ester of an aliphatic polybasic acid such as dibutyl adipate, dioctyl adipate, diisononyl adipate, dibutyl azelate, dioctyl azelate, diisononyl azelate or the like; a phosphate such as tricresyl phosphate or the like; a polyester based plasticizer in which a terminal of a polycondensate is sealed with a monohydric alcohol or a monovalent carboxylic acid, the polycondensate having a molecular mass of about 600 to 8,000 and produced from a polyvalent carboxylic acid such as adipic acid, azelaic acid, sebacic acid, phthalic acid or the like and a polyol such as ethylene glycol, 1,2-propylene glycol, 1,2-butylene glycol, 1,3-butylene glycol, 1,4-butylene glycol or the like; an epoxy based plasticizer such as an epoxidized soybean oil, an epoxidized linseed oil, an epoxidized tall oil, an aliphatic acid-2-ethylhexyl or the like; a chlorinated paraffin or the like can be listed.

The amount of use of the plasticizer is preferably 30 parts by mass or less to 100 parts by mass of the sum of the polylactic acid polymer (A) and the acrylic polymer (B) from the viewpoint of transparency, more preferably 10 parts by mass, however, most preferably 0 part by mass from the viewpoint of transparency.

As the lubricant, for example, a pure hydrocarbon such as liquid paraffin low molecular weight polyethylene or the like; a halogenated hydrocarbon; an aliphatic acid such as a higher fatty acid, an oxy aliphatic acid or the like; an aliphatic acid amide; a polyol ester of an aliphatic acid such as glyceride or the like; an aliphatic alcohol ester of an aliphatic acid (ester wax); a metal soap; an aliphatic alcohol; a polyol; a polyglycol; a polyglycerol; a partial ester of an aliphatic acid and a polyol; an ester such as partial ester of an aliphatic acid and a polyglycol or an aliphatic acid and a polyglycerol; a (meth) acrylate based copolymer or the like can be listed.

As the heat resistance improver, for example, a (meth) acrylate based copolymer, imide based copolymer, styrene-acrylonitrile based copolymer or the like can be listed.

The amount of use of the lubricant is preferably 5 parts by mass or less to 100 parts by mass of the sum of the polylactic acid polymer (A) and the acrylic polymer (B) from the viewpoint of transparency, more preferably 1 part by mass, however, most preferably 0 part by mass from the viewpoint of transparency.

(Method for Producing Thermoplastic Resin Composition)

The method for producing the thermoplastic resin composition of the present invention is not particularly limited and various conventionally known methods can be used, however, normally, a melt mixing method is preferable. Further, if needed, a small amount of solvent may be used. As a device for mixing, extruder, Banbury mixer, roller, kneader or the like can be listed. These devices are operated batch wise or continuously. Order of mixing the components is not particularly limited.

The molded article of the present invention is obtained by molding the above-mentioned thermoplastic resin composition. The molding method is not particularly limited and a suitable method for the thermoplastic resin composition of the present invention may be selected from publicly known molding methods. For example, a method of using a molding machine such as extruder, injection molder, blow molding machine, inflation machine, calendaring machine or the like can be listed. Among them, the molding method of using extruder, injection molder, blow molding machine or calendaring machine is preferable from the viewpoint of providing high transparency. Further, the molded article of the present invention has its total light transmittance of 65% or more, preferably 70% or more, furthermore preferably 80% or more. The total light transmittance here is a value obtained by a measurement according to ASTM D1003, with a sample of 3 mm in thickness, 10 cm square, manufactured by injection molding using the thermoplastic resin composition.

Further, the molded article of the present invention has its haze of 60% or less, preferably 40% or less, furthermore preferably 20% or less. The haze here is a value obtained by a measurement according to ASTM D1003, with a sample of 3 mm in thickness, 10 cm square, manufactured by injection molding using the thermoplastic resin composition.

The molded article thus obtained can be used in building materials, automobiles, toys, general merchandise such as stationery goods and further in automobile parts, OA devices and domestic appliances, however, in particular, it is preferably used in building materials, automobile parts, OA devices and domestic appliances owing to its excellent transparency, impact resistance and beat resistance.

EXAMPLES

Hereinafter, the present invention will be concretely explained with reference to Examples and Comparative Examples. However, the present invention is not limited to these Examples.

Further, in the present invention, "part(s)" and "%" mean "part(s) by mass" and "% by mass", respectively, unless otherwise described.

Various evaluation was carried out by the following methods.

(1) Average Particle Diameter

Mass average particle diameter of polyorganosiloxane in latex and that of a graft copolymer in polymer latex were obtained with dynamic light scattering by using DSL-700 type manufactured by OTSUKA ELCTRONICS CO., LTD.

(2) Measurement of Mass Average Molecular Mass (GPC Measurement)

A dried sample was dissolved in tetrahydrofuran (THF) at 40° C. for 1 hour, and the resultant solution was kept still standing over night at room temperature, and mass average molecular mass was measured with GPC (HLC-8020) manufactured by Tosoh Corporation using GPC column (TSK-GEL; 2 of GMHXL) of the same manufacturer under the following condition. Calibration curve of GPC was obtained by using monodisperse polystyrene of the same manufacturer.
Sample concentration: 0.1 g/dl
Amount of injection: 0.1 ml
Column temperature: 40° C.

(3) Manufacture of a Pellet

Examples 1 to 10, Comparative Examples 1 to 13

A pellet of a thermoplastic resin composition was obtained by melt kneading a polylactic acid polymer (A), an acrylic polymer (B), a graft copolymer (C) and the other component by using a same-direction twin-screw extruder having φ30 mm, and L/D of 28.

Examples 11 to 17, Comparative Examples 14 to 16

A pellet of a thermoplastic resin composition was obtained by melt kneading a polylactic acid polymer (A), an acrylic polymer (B), a graft copolymer (C) and the other component by using a same-direction twin-screw extruder (TEX-30α; manufactured by JSW) having φ30 mm, and L/D of 35.

(4) Manufacture of a Test Piece for Evaluation

A 10 cm square plate was obtained with injection molding method, using the above-mentioned thermoplastic resin composition pellet.

(5) Charpy Impact Strength

A test piece having 10 mm in width, 4 mm in height and 12.7 mm in length was molded with injection molding method, using the above-mentioned thermoplastic resin composition pellet, and Charpy impact strength thereof at 23° C. was measured by JIS K-7111.

(6) Total Light Transmittance

A plate having 3 mm in thickness, 10 cm square was molded with injection molding method, using the above-mentioned thermoplastic resin composition pellet, and total light transmittance thereof was measured according to ASTM D1003.

(7) Haze

A plate having 3 mm thickness, 10 cm square was molded with injection molding method, using the above-mentioned thermoplastic resin composition pellet, and haze thereof was measured according to ASTM D1003.

(8) Izod Impact Strength

A rod molded article having 12.7 mm in width, 4 mm in height and 127 mm in length was molded with injection molding method, using the above-mentioned thermoplastic resin composition pellet, and a test piece having 12.7 mm in width, 4 mm in height and 63.5 mm in length was cut out from it and Izod imp strength thereof at 23° C. was measured by JIS K-7113.

(9) Deflection Temperature Under Load

Examples 1 to 10, Comparative Examples 1 to 13

Deflection temperature under load was measured with a test piece having 10 mm in width, 4 mm in height and 12.7 mm in length molded with injection molding method, according to ISO75 under the condition of 1.80 MPa load.

Examples 11 to 17, Comparative Examples 14 to 16

Deflection temperature under load was measured with a test piece having 12.7 mm in width, 3.2 mm in height and 127 mm in length molded with injection molding method, according to JIS K-7191 under the condition of 0.45 MPa load.

(10) Refractive Index

Measurement of the Total Refractive Index, Rab, of the Polylactic Acid Polymer (A) and the Acrylic Polymer (B)

A rod molded article having 12.7 mm in width, 4 mm in height and 127 mm in length was molded with injection molding method, using a pellet made only from the polylactic acid polymer (A) and the acrylic polymer (B), and a test piece having 12.7 mm in width, 4 mm in length and 1 mm in thickness was cut out from it and refractive index thereof was measured with Abbe's refractometer according to ASTM-D542. Zinc chloride saturated aqueous solution was used as contact liquid.

Measurement of the Refractive Index, Rc, of the Graft Copolymer (C)

A thin film with about 1 mm in thickness was prepared with heat under press method (preliminary heating at 150° C. for 5 minutes followed by pressing for 1 minute and cooling for 2 minutes) using powder of the graft copolymer (C). Refractive index of the thin film thus obtained was measured with Abbe's refractometer. Zinc chloride saturated aqueous solution was used as contact liquid.

Production Example 1

Production of Acrylic Rubber Based Graft Copolymer (M-1)

A mixture composed of 100 parts of 2-ethylhexyl acrylate and 1.0% by mass equivalent of allyl methacrylate to the amount of 2-ethylhexyl acrylate was added to 195 parts of distilled water dissolving 0.8 part of sodium lauryl sulfite and the resultant liquid was preliminary stirred at 10,000 rpm by homomixer and further emulsified and dispersed with homogenizer at 30 MPa pressure to obtain a (meth)acrylate emulsion.

The emulsion thus obtained was transferred to a separable flask equipped with a condenser and a mixing blade and replaced by nitrogen and heated to 50° C. with stirring and 0.5 part of tertiarybutyl hydroperoxide was added. Then, the resultant mixture was heated to 50° C. and a mixed liquid of 0.002 part of iron sulfate, 0.006 part of disodium ethylenediaminetetraacetate, 0.26 part of Rongalite and 5 parts of distilled water was added and kept for 5 hours to obtain acrylic rubber (AR5) latex, finishing the first stage of polymerization.

Into the acrylic rubber (AR5) latex, a mixed liquid of 0.06 part of tertiarybutyl hydroperoxide, 13 parts of methyl methacrylate and 2.0 parts of butyl acrylate was dropped for 15 minutes at 70° C. and kept for 4 hours at 70° C. to obtain latex of acrylic rubber based graft copolymer (ARL7), finishing graft polymerization. The graft copolymer latex thus obtained was dropped into 200 parts of hot water dissolving 1.5% by mass of calcium chloride, the acrylic rubber based graft copolymer (ARL7) was coagulated, separated, washed and dried at 75° C. for 16 hours to obtain powder acrylic rubber based graft copolymer (M-1).

Examples 1 to 10, Comparative Examples 1 to 13

LACEA H-100 (manufactured by MITSUI CHEMICALS, INC.) was used as the polylactic acid polymer (A). ACRYPET VH (manufactured by MITSUBISHI RAYON CO., LTD., methyl methacrylate (MMA)-methyl acrylate (MA) copolymer, mass average molecular mass (measured with GPC) of 60,000) was used as the acrylic polymer (B). The following graft copolymers (1) to (10), (M-1) were used as the graft copolymer (C). Further, "Plamate PD-150" manufactured by Dainippon Ink and Chemicals, Incorporated was used as a biodegradable reinforcing agent, and these were hand-blended with an amount shown in Tables 1 to 3 and the resultant mixture was melt kneaded by using a same-direction twin-screw extruder (PCM30-28.5; manufactured by IKEGAI Corporation) at a barrel temperature of 200° C., a number of revolutions of screw of 150 rpm to obtain its pellet, and a test piece for evaluation was made by using this pellet and provided for various evaluation. The results are shown in Tables 1 to 3.

In the graft copolymers shown in the tables, the followings were used.

(1) S-2005, METABLEN S-2005, poly(organosiloxane/acryl) based compound rubber graft copolymer manufactured by MITSUBISHI RAYON CO., LTD.

(2) S-2001: METABLEN S-2001, poly(organosiloxane/acryl) based compound rubber graft copolymer manufactured by MITSUBISHI RAYON CO., LTD.

(3) SRK-200: METABLEN SRK-200, poly(organosiloxane/acryl) based compound rubber graft copolymer manufactured by MITSUBISHI RAYON CO., LTD.

(4) W-450A: METABLEN W-450A, acrylic rubber based graft copolymer manufactured by MITSUBISHI RAYON CO., LTD.

(5) W-460A: METABLEN W-460A, acrylic rubber based graft copolymer manufactured by MITSUBISHI RAYON CO., LTD.

(6) FM-50: Kane Ace FM-50, acrylic rubber based graft copolymer manufactured by KANEKA CORPORATION (7) IM-808: IM-808, acrylic rubber based graft copolymer manufactured by LG Corp.

(8) KM-355P: KM-355P, acrylic rubber based graft copolymer manufactured by Rohm & Haas Company (9) C-223A: METABLEN C-223A, diene rubber based graft copolymer manufactured by MITSUBISHI RAYON CO., LTD.

(10) C-102: METABLEN C-102, diene rubber based graft copolymer manufactured by MITSUBISHI RAYON CO., LTD.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Polylactic acid polymer (A) | LACEA H-100 | 50 | 50 | 50 | 50 | 50 | 50 | 50 | 50 | 75 | 75 |
| Acrylic polymer (B) | ACRYPET VH | 50 | 50 | 50 | 50 | 50 | 50 | 50 | 50 | 25 | 25 |
| Graft copolymer (C) | S-2001 | — | — | — | — | — | — | — | — | — | 15 |
|  | W-450A | 15 | 20 | 25 | — | — | — | — | — | 15 | — |
|  | W-460A | — | — | — | 15 | — | — | — | — | — | — |
|  | FM-50 | — | — | — | — | 15 | — | — | — | — | — |
|  | IM-808 | — | — | — | — | — | 15 | — | — | — | — |
|  | KM-355P | — | — | — | — | — | — | 15 | — | — | — |
|  | M-1 | — | — | — | — | — | — | — | 15 | — | — |
| Biodegradable reinforcing agent | Plamate PD-150 | — | — | — | — | — | — | — | — | — | — |
| Charpy impact strength (KJ/m$^2$) |  | 5.5 | 9.4 | 11.2 | 3.4 | 2.9 | 2.1 | 1.9 | 3.4 | 5.6 | 27.7 |
| Total light transmittance (%) |  | 85.2 | 84.4 | 83.9 | 86.5 | 82.7 | 85.4 | 83.7 | 91.1 | 86.1 | 69.9 |
| Haze (%) |  | 14.6 | 15.0 | 15.3 | 13.3 | 17.1 | 12.9 | 8.4 | 13.8 | 16.4 | 54.4 |
| Deflection temperature under load (°C.) |  | 61.6 | 62.0 | 61.7 | 61.6 | 61.4 | 61.7 | 61.8 | 61.7 | 56.6 | 56.9 |
| Rab |  | 1.469 | 1.469 | 1.469 | 1.469 | 1.469 | 1.469 | 1.469 | 1.469 | 1.461 | 1.461 |
| Rc |  | 1.469 | 1.469 | 1.469 | 1.469 | 1.470 | 1.469 | 1.470 | 1.468 | 1.469 | 1.464 |
| Rc-Rab |  | 0 | 0 | 0 | 0 | 0.001 | 0 | 0.001 | −0.001 | 0.008 | 0.003 |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Polylactic acid polymer (A) | LACEA H-100 | 100 | 100 | 100 | 100 | 100 | 100 | 100 | 100 |
| Acrylic polymer (B) | ACRYPET VH | — | — | — | — | — | — | — | — |
| Graft copolymer (C) | S-2005 | 15 | — | — | — | — | — | — | — |
|  | S-2001 | — | 15 | — | — | — | — | — | — |
|  | SRK-200 | — | — | 15 | — | — | — | — | — |
|  | W-450A | — | — | — | 15 | — | — | — | — |
|  | FM-50 | — | — | — | — | 15 | — | — | — |
|  | IM-808 | — | — | — | — | — | 15 | — | — |
|  | KM-355P | — | — | — | — | — | — | 15 | — |
|  | M-1 | — | — | — | — | — | — | — | 15 |
|  | C-102 | — | — | — | — | — | — | — | — |
|  | C-223 | — | — | — | — | — | — | — | — |
| Biodegradable reinforcing agent | Plamate PD-150 | — | — | — | — | — | — | — | — |
| Charpy impact strength (KJ/m$^2$) |  | 23.4 | 17.9 | 9.6 | 5.2 | 3.5 | 3.6 | 4.7 | 5.2 |
| Total light transmission (%) |  | 70.3 | 67.2 | 45.4 | 69.3 | 72.7 | 72.1 | 75.7 | 70.7 |
| Haze (%) |  | 44.0 | 50.6 | 89.7 | 60.6 | 37.2 | 46.7 | 44.8 | 63.6 |
| Deflection temperature under load (°C.) |  | 52.6 | 52.3 | 53.1 | 52.5 | 52.2 | 52.9 | 52.3 | 52.3 |
| Rab |  | 1.449 | 1.449 | 1.449 | 1.449 | 1.449 | 1.449 | 1.449 | 1.449 |
| Rc |  | 1.464 | 1.464 | 1.478 | 1.469 | 1.469 | 1.470 | 1.469 | 1.47 |
| Rc-Rab |  | 0.015 | 0.015 | 0.029 | 0.020 | 0.020 | 0.021 | 0.02 | 0.021 |

TABLE 3

|  |  | Comp. Ex. 1 | Comp. Ex. 9 | Comp. Ex. 10 | Comp. Ex. 11 | Comp. Ex. 12 | Comp. Ex. 13 |
|---|---|---|---|---|---|---|---|
| Polylactic acid polymer (A) | LACEA H-100 | 100 | 50 | 50 | 25 | 50 | 50 |
| acrylic polymer (B) | ACRYPET VH | — | 50 | 50 | 75 | 50 | 50 |
| Graft copolymer (C) | S-2005 | 15 | — | — | — | — | — |
|  | S-2001 | — | — | — | 15 | — | — |
|  | SRK-200 | — | — | — | — | — | — |
|  | W-450A | — | — | — | — | — | — |
|  | FM-50 | — | — | — | — | — | — |
|  | IM-808 | — | — | — | — | — | — |
|  | KM-355P | — | — | — | — | — | — |
|  | M-1 | — | — | — | — | — | — |
|  | C-102 | — | — | — | — | 15 | — |
|  | C-223 | — | — | — | — | — | 15 |
| Biodegradable reinforcing agent | Plamate PD-150 | — | — | 15 | — | — | — |
| Charpy impact strength (KJ/m$^2$) |  | 23.4 | 2.1 | 2.2 | 5.7 | 1.9 | 22.2 |

TABLE 3-continued

|  | Comp. Ex. 1 | Comp. Ex. 9 | Comp. Ex. 10 | Comp. Ex. 11 | Comp. Ex. 12 | Comp. Ex. 13 |
|---|---|---|---|---|---|---|
| Total light transmission (%) | 70.3 | 92.7 | 91.1 | 52.2 | 36.4 | 35.5 |
| Haze (%) | 44.0 | 5.4 | 7.6 | 88.0 | 87.6 | 89.5 |
| Deflection temperature under load (° C.) | 52.6 | 64.4 | 60.7 | 74.5 | 62.7 | 62.3 |
| Rab | 1.449 | 1.469 | 1.469 | 1.48 | 1.469 | 1.469 |
| Rc | 1.464 | — | — | 1.469 | 1.514 | 1.51 |
| Rc-Rab | 0.015 | — | — | −0.011 | 0.045 | 0.041 |

Production Example 2

Production of Butadiene/Acrylic Rubber Based Graft Copolymer (M-2)

(1) Production of Butadiene/Acrylic Rubber Polymer Latex (b-1)

The following materials were fed in a 70L autoclave, and heated and when the temperature reached 43° C., a redox type initiator was added to start the reaction and the system was further heated to 60° C.

| 1,3-Butadiene | 10 parts |
|---|---|
| Butyl acrylate | 90 parts |
| Tallow aliphatic acid potassium salt | 0.93 part |
| M-Lauroylsarcosine sodium salt | 0.39 part |
| Diisopropyl benzene peroxide | 0.22 part |
| Deionized water | 200 parts |
| (Redox type initiator) | |
| Ferrous sulfate | 0.0024 part |
| Dextrose | 0.16 part |
| Sodium pyrophosphate | 0.24 part |
| Disodium ethylenediaminetetraacetate | 0.0009 part |
| Deionized water | 5.25 parts |

When 5 hours passed from the start of the reaction, 0.39 part of tallow aliphatic acid potassium salt and 0.16 part of M-lauroylsarcosine sodium salt were further added and a rubber polymer latex (b-1) was obtained. The particle diameter of the butadiene/acrylic rubber polymer latex (b-1) thus obtained was 91 nm.

(2) Polymerization of Carboxyl Group-containing Copolymer (b2-1)

As a carboxyl group-containing copolymer, the following mixture was polymerized at 63° C. for 4 hours to obtain a emulsion (MAA-BA copolymer) of pH 5.0 with 98% conversion.

| n-Butyl acrylate | 85 parts |
|---|---|
| Methacrylic acid | 15 parts |
| Sodium oleate | 1.75 parts |
| Sodium dioctyl sulfosuccinate | 3.57 parts |
| Potassium persulfate | 0.3 part |
| Deionized water | 200 parts |

(3) Production of Graft Copolymer (M-2)

To 70 parts, as solid content, of the butadiene/acrylic rubber polymer latex (b-1), 2.0 parts in terns of solid content of the carboxyl group containing copolymer (b2-1) was added and stirred at room temperature for 30 minutes in a flask. Then, 2.0 parts of potassium alkenyl succinate and 0.6 part of sodium formaldehyde sulfoxylate were fed in the flask and the inside temperature was kept at 70° C. A mixture of 28.5 parts of methyl methacrylate, 1.5 parts of n-butyl acrylate and 0.375 part based on 100 parts of the above monomer mixture, of cumene hydroperoxide was dropped in the flask for 70 minutes, and the resultant mixture was kept for 1.5 hours to obtain graft copolymer latex, finishing graft copolymerization step.

To the graft copolymer latex thus obtained, 0.5 part of butylated hydroxytoluene was added, and the resultant mixture was coagulated by adding 18.8% calcium acetate aqueous solution, and heat treated at 90° C. and solidified. Then, the solidified material was washed by hot water and dried to obtain graft copolymer (M-2).

Production Example 3

Production of Butadiene/Acrylic Rubber Based Graft Copolymer (M-3)

To 75 parts, as solid content, of the butadiene/acrylic rubber polymer latex (b-1) obtained in Production Example 2, 2.0 parts in terms of solid content of the carboxyl group-containing copolymer (b2-1) was added and stirred at room temperature for 30 minutes in a flask.

Then, 2.0 parts of potassium alkenyl succinate and 0.6 part of sodium formaldehyde sulfoxylate were fed in the flask and the inside temperature was kept at 70° C. A mixture of 23.8 parts of methyl methacrylate, 1.3 parts of n-butyl acrylate and 0.375 part, based on 100 parts of the above monomer mixture, of cumene hydroperoxide was dropped in the flask for 70 minutes, and the resultant mixture was kept for 1.5 hours to obtain graft copolymer latex, finishing graft copolymerization step.

To the graft copolymer latex thus obtained, 0.5 part of butylated hydroxytoluene was added, and the mixture was coagulated by adding 18.8% calcium acetate aqueous solution, and heat treated at 90° C. and solidified. Then, the solidified material was washed by hot water and dried to obtain graft copolymer (M-3).

Production Example 4

Production of Butadiene/Acrylic Rubber Based Graft Copolymer (M-4)

To 80 parts, as solid content, of the butadiene/acrylic rubber polymer latex (b-1) obtained in Production Example 2, 2.0 parts in terms of solid content of the carboxyl group containing copolymer (b2-1) was added and stirred at room temperature for 30 minutes in a flask.

Then, 2.0 parts of potassium alkenyl succinate and 0.6 part of sodium formaldehyde sulfoxylate were fed in the flask and the inside temperature was kept at 70° C. A mixture of 19 parts of methyl methacrylate, 1.0 parts of n-butyl acrylate and 0.375 parts, based on 100 parts of the above monomer mixture, of cumene hydroperoxide was dropped in the flask for 70 minutes, and the resultant mixture was kept for 1.5 hours to obtain graft copolymer latex, finishing graft copolymerization step.

To the graft copolymer latex thus obtained, 0.5 part of butylated hydroxytoluene was added, and the mixture was coagulated by adding 18.8% calcium acetate aqueous solution, and heat treated at 90° C. and solidified. Then, the solidified material was washed by hot water and dried to obtain graft copolymer (M-4).

Production Example 5

Production of Butadiene/Acrylic Rubber Based Graft Copolymer (M-5)

The same procedure as in Production Example 4 was carried out except that he ratio of the butadiene/acrylic rubber based graft copolymer latex was changed to 20/80 to obtain graft copolymer (M-5). The particle diameter of the butadiene/acrylic rubber polymer latex thus obtained was 92 nm.

Production Example 6

Production of Butadiene/Acrylic Rubber Based Graft Copolymer (M-6)

The same procedure as in Production Example 4 was carried out except that the ratio of the butadiene/acrylic rubber based graft copolymer latex was changed to 5/95 to obtain graft copolymer (M-6). The particle diameter of the butadiene/acrylic rubber polymer latex thus obtained was 89 nm.

Production Example 7

Production of Butadiene/Acrylic Rubber Based Graft Copolymer (M-7)

(1) Polymerization of Carboxyl Group Containing Copolymer (b2-2)

As a carboxyl group containing copolymer, the following mix was polymerized at 63° C. for 4 hours to obtain a emulsion (MAA-BA copolymer) of pH 5.0 with 98% conversion.

| | |
|---|---|
| n-Butyl acrylate | 85.5 parts |
| Methacrylic acid | 11.5 parts |
| Sodium oleate | 1.47 parts |
| Sodium dioctyl sulfosuccinate | 3.57 parts |
| Potassium persulfate | 0.3 part |
| Deionized water | 200 parts |

(2) Production of Graft Copolymer (M-7)

The same procedure as in Production Example 4 was carried out except that to 75 parts, as solid content, of the butadiene/acrylic rubber polymer latex (b-1) obtained in Production Example 3, 2.0 parts in terms of solid content of the carboxyl group-containing copolymer (b2-2) was added to obtain graft copolymer (M-7).

Examples 11 to 17, Comparative Examples 14 to 16

LACEA H-100 (manufactured by MITSUI CHEMICALS, INC.) was used as the polylactic acid polymer (A), and ACRYPET VH (manufactured by MITSUBISHI RAYON CO., LTD., methyl methacrylate (MMA)-methyl acrylate (MA) copolymer, mass average molecular mass (measured with GPC) of 60,000) was used as the acrylic polymer (B), and the graft copolymers (M-2) to (M-7) were used as the graft copolymer (C) and these were hand-blended with an amount shown in Tables 4 and 5 and the resultant mixture was melt kneaded by using a same-direction twin-screw extruder (TEX-30α; manufactured by JSW) at a barrel temperature of 210° C., a number of revolutions of screw of 200 rpm to obtain its pellet, and a test piece for evaluation was made by using this pellet and provided for various evaluation. The results are shown in Tables 4 and 5.

TABLE 4

| | | Ex. 11 | Ex. 12 | Ex. 13 | Ex. 14 | Ex. 15 | Ex. 16 | Ex. 17 |
|---|---|---|---|---|---|---|---|---|
| Polylactic acid polymer (A) | LACEA H-100 | 40 | 40 | 40 | 40 | 40 | 40 | 40 |
| Acrylic polymer (B) | ACRYPET VH | 60 | 60 | 60 | 60 | 60 | 60 | 60 |
| Graft copolymer (C) | W-450A | 25 | — | — | — | — | — | — |
| | M-2 | — | 25 | — | — | — | — | — |
| | M-3 | — | — | 25 | — | — | — | — |
| | M-4 | — | — | — | 25 | — | — | — |
| | M-5 | — | — | — | — | 25 | — | — |
| | M-6 | — | — | — | — | — | 25 | — |
| | M-7 | — | — | — | — | — | — | 25 |
| Izod impact strength (KJ/m$^2$) | | 9.1 | 4.3 | 6.2 | 12.3 | 7.6 | 7.7 | 8.2 |
| Total light transmission (%) | | 72.4 | 91.1 | 90.6 | 91.6 | 85.1 | 89.0 | 91.4 |
| Haze (%) | | 34.5 | 7.6 | 8.2 | 6.4 | 16.6 | 9.8 | 8.2 |
| Deflection temperature under load (° C.) | | 65.1 | 67.3 | 65.4 | 65.0 | 66.8 | 65.8 | 66.7 |
| Rab | | 1.476 | 1.476 | 1.476 | 1.476 | 1.476 | 1.476 | 1.476 |
| Rc | | 1.469 | 1.480 | 1.480 | 1.480 | 1.484 | 1.478 | 1.482 |
| Rc-Rab | | −0.007 | 0.004 | 0.004 | 0.004 | 0.008 | 0.002 | 0.006 |

TABLE 5

|  |  | Comp. Ex. 14 | Comp. Ex. 15 | Comp. Ex. 16 |
| --- | --- | --- | --- | --- |
| Polylactic acid polymer (A) | LACEA H-100 | 40 | 100 | — |
| Acrylic polymer (B) | ACRYPET VH | 60 | — | 100 |
| Izod impact strength (KJ/m$^2$) | | 1.2 | 1.3 | 1.3 |
| Total light transmission (%) | | 92.4 | 90.6 | 92.7 |
| Haze (%) | | 3.7 | 13.1 | 1.0 |
| Deflection temperature under load (° C.) | | 68.0 | 53.5 | 97.6 |
| Rab | | 1.476 | 1.454 | 1.489 |
| Rc | | — | — | — |
| Rc-Rab | | — | — | — |

From the results of these Examples and Comparative Examples, it is readily apparent that the thermoplastic resin composition of the present invention can provide a molded article having excellent transparency, heat resistance and impact strength.

INDUSTRIAL APPLICABILITY

According to the thermoplastic resin composition of the present invention, a molded article having excellent transparency, heat resistance and impact resistance can be obtained. Therefore, the thermoplastic resin composition of the present invention can be used as a substitute of conventionally used general-purpose plastics of petroleum origin such as transparent polyvinyl chloride, polyethylene terephthalate or the like and can be utilized in a wide range of use such as building materials, automobiles, toys, general merchandise such as stationery goods, and further, automobile parts, OA devices and domestic appliances.

What is claimed is:

1. A thermoplastic resin composition comprising:
    a polylactic acid polymer (A);
    an acrylic polymer (B) containing a methyl methacrylate monomer unit; and
    a graft copolymer (C) obtained by graft-polymerizing a vinyl monomer onto a rubbery polymer,
    wherein the refractive index, Rc, of the graft copolymer (C) and the total refractive index, Rab, of the polylactic acid polymer (A) and the acrylic polymer (B) satisfy the following formula (1)

$$-0.004 \leq Rc-Rab \leq +0.008 \qquad (1).$$

2. The thermoplastic resin composition according to claim 1, wherein the compositional ratio of the polylactic acid polymer (A) to the acrylic polymer (B) is within the range of from 1/99 to 99/1 (mass ratio).

3. The thermoplastic resin composition according to claim 1, wherein 1 to 50 parts by mass of the graft copolymer (C) to 100 parts by mass of the total of the polylactic acid polymer (A) and the acrylic polymer (B) is blended.

4. The thermoplastic resin composition according to claim 1, wherein the graft copolymer (C) is obtained by using a silicone rubber containing a polyorganosiloxane or an acrylic rubber containing a polyalkyl(meth)acrylate rubber as the rubbery polymer.

5. A molded article obtained by molding the thermoplastic resin composition according to claim 1.

6. The molded article according to claim 5, wherein total light transmittance of the molded article is 65% or more.

7. The molded article according to claim 6, wherein haze of the molded article is 60% or less.

8. A molded article obtained by molding the thermoplastic resin composition according to claim 2.

9. A molded article obtained by molding the thermoplastic resin composition according to claim 3.

10. A molded article obtained by molding the thermoplastic resin composition according to claim 4.

* * * * *